United States Patent [19]

Clugston

[11] Patent Number: 5,201,398
[45] Date of Patent: Apr. 13, 1993

[54] APPARATUS FOR UNSCRAMBLING SEALED CONTAINERS

[76] Inventor: Charles M. Clugston, Rt. 1, Box 471A, Sapulpa, Okla. 74066

[21] Appl. No.: 902,518

[22] Filed: Jun. 22, 1992

Related U.S. Application Data

[63] Continuation of Ser. No. 713,392, Jun. 4, 1991, abandoned.

[51] Int. Cl.$^5$ .............................................. B65G 47/14
[52] U.S. Cl. ..................................... 198/396; 198/394; 198/415; 198/443; 99/360
[58] Field of Search ............... 198/389, 394, 396, 397, 198/415, 443, 817; 99/360, 361, 477

[56] References Cited

U.S. PATENT DOCUMENTS

| | | | |
|---|---|---|---|
| 2,252,498 | 8/1941 | Flaws, Jr. ...................... | 198/396 X |
| 2,937,738 | 5/1960 | Albertoli et al. ............... | 198/396 X |
| 3,288,265 | 11/1966 | Smith .............................. | 198/443 |
| 3,417,881 | 12/1968 | Loveless . | |
| 3,417,896 | 12/1968 | Loveless . | |
| 3,425,530 | 2/1969 | Carter ........................... | 198/396 |
| 3,522,873 | 8/1970 | Wallace ......................... | 198/443 |
| 5,009,150 | 4/1991 | Andersen ....................... | 99/360 |

*Primary Examiner*—Joseph E. Valenza
*Assistant Examiner*—Tuan N. Nguyen
*Attorney, Agent, or Firm*—Head & Johnson

[57] ABSTRACT

An apparatus for unscrambling sealed cylindrical containers, the apparatus having an upright open top vessel substantially filled with water, an elongated inclined unscrambler bed having an intake end submersed in the water and a discharge end which extends above the water surface, a plurality of sets of belts arranged in paralleled spaced apart vertical planes and supported by the unscrambler bed, each of the belts passing upwardly over the bed upper surface and downwardly below the bed lower surface, the containers to be unscrambled being dumped within the water to settle downwardly through the water and onto the unscrambler bed intake end, the belts serving to move the containers as they engage the belts upwardly and above the water surface onto a traveling take away belt for further processing. In the preferred arrangement some of the belts in each set of belts travel at different speeds so that containers moving on each set of belts tend to assume the lengthwise position.

20 Claims, 4 Drawing Sheets

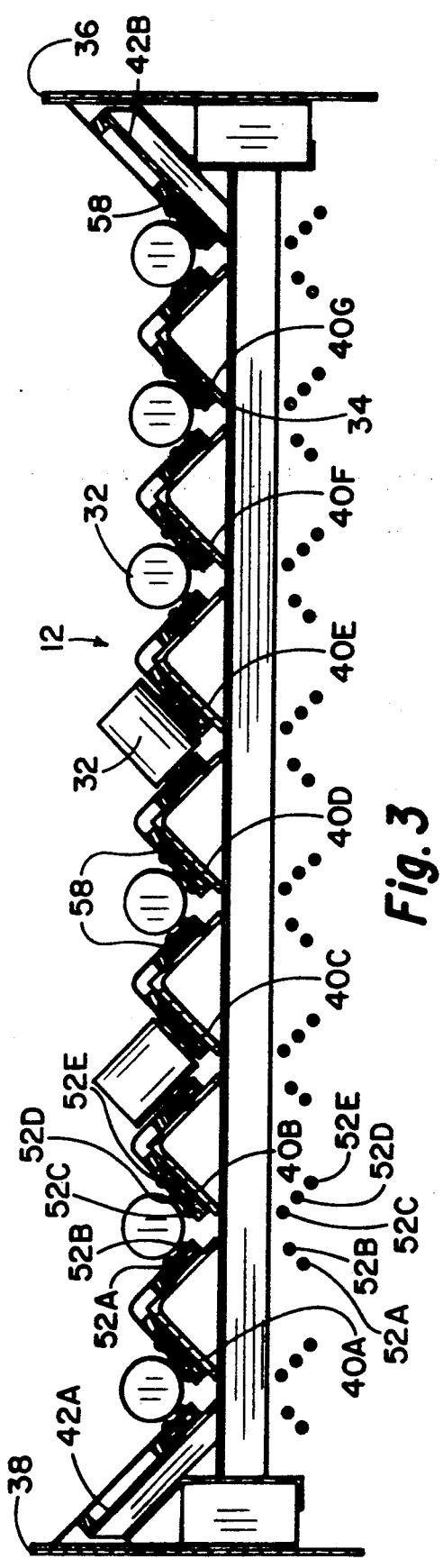
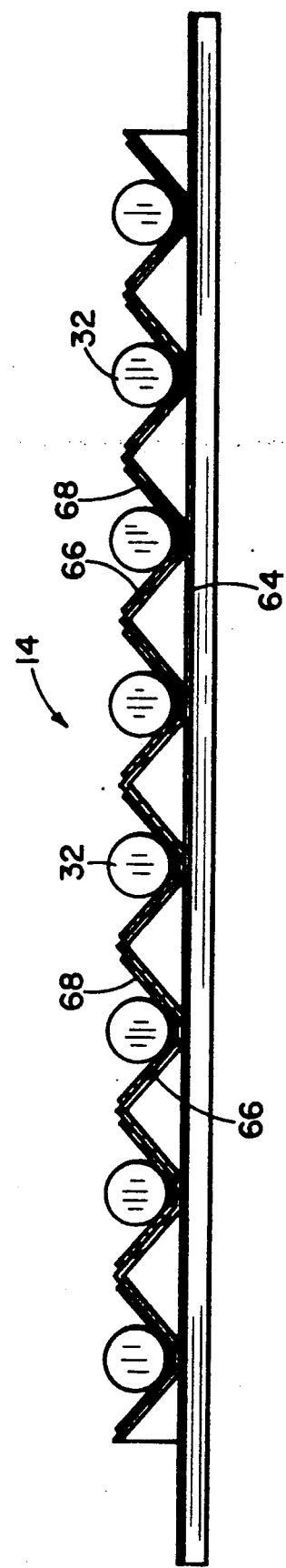
Fig. 3
Fig. 4

APPARATUS FOR UNSCRAMBLING SEALED CONTAINERS

This is a continuation of copending application Ser. No. 07/713,392 filed on Jun. 4, 1991, now abandoned.

SUMMARY OF THE INVENTION

Modern canning techniques have, like all other industries, moved toward systems for handling large quantities of individual items with minimum labor. Further, in the canning industry it is important that containers be handled in a way to minimize denting, since denting or other actions that cause the sealed containers to assume a non-uniform shape not only reduce customer appeal but can result in a higher failure rate of the canned products.

While various items are sealed in containers for distribution, by far the largest use of sealed containers is in preserving, packaging and distributing food. Food is customarily processed by first preparing and depositing the food in containers, after which lids are sealed on the containers to form an entirely closed vessel. Since most food will spoil if not further processed, the sealed containers of food are then cooked under pressure, that is, are heated for a selected temperature and for a selected time to destroy all of the bacteria in the containers. For this purpose, large mass pressure cookers are employed and for references to a type of pressure cooker commonly employed in the food processing business, reference may be had to U.S. Pat. Nos. 3,417,881 and 3,417,896.

One of the problems in dealing with containers of food after they have been cooked in a pressure cooker is that of unscrambling the containers for subsequent labeling and packaging for storage and ultimate distribution. The present disclosure is directed to an improved apparatus for unscrambling sealed containers.

The typical high volume pressure cooker as employed in the canning industry today, of the type referenced in the above-identified previously issued U.S. patents, discharge the containers from a lower open bottom. The unscrambling apparatus of this disclosure employs an upright open top vessel (which may also be termed a "tank" or "long canal") having opposed ends and opposed sidewalls. The vessel is substantially filled with water. It has been learned that substantially less damage occurs to containers if they are handled under water, therefore, this disclosure takes advantage of the reduction in damage to containers as they are deposited from a cooker by first discharging the containers into the vessel filled with water wherein the containers settle downwardly within the water in a manner such that as the containers contact each other under water, the chance of denting the containers is substantially reduced.

Positioned within the vessel is an elongated inclined unscrambler bed having an intake end and a discharge end. The unscrambler bed has an upper surface and a lower surface. The unscrambler bed intake end is adjacent one end of the upright vessel and is submersed in water. The discharge end is adjacent the vessel other end and is above the water surface.

A plurality of sets of belts are mounted on the unscrambler bed. The sets of belts are arranged in paralleled spaced apart vertical planes. Each set of belts passes upwardly over the unscrambler bed upper surface and downwardly below the bed lower surface.

Each set of belts is formed of a plurality of belts, such as five belts, in spaced apart vertical planes. The belts in each set are arranged in generally V-shaped configuration taken in planes perpendicular the direction of travel. In the preferred arrangement, the V-shaped arrangement is obtained using a different number of belts on one side of the "V" than on the other side, such as, by example, three belts on one side of the "V" and two belts on the other side of the "V".

As containers enter the vessel at the intake end they settle downwardly into the water and engage the moving sets of belts. As the containers engage and rest on the moving sets of belts they are carried upwardly on the inclined unscrambler bed.

In the preferred arrangement, not only are the belts arranged in V-shaped configuration having an unequal number on each side of the "V" but the belts in each set move independently at various speeds. The use of the V-shaped arrangement with an uneven number of belts making up the "V" and with different rates of movement in the belts in each set tends to cause the containers that fall on each set of belts to align in (longitudinal or a "bullet") preferred orientation as the containers are transported upwardly on the inclined unscrambler bed.

As the containers move upwardly on the inclined unscrambler bed they move above the water surface and pass off of the discharge end of the unscrambler bed onto a short downwardly inclined set of slide plates. At the end of the slide plates the individual containers pass onto a lane transition apparatus wherein the containers are arranged in a sequence of lanes and cause to move in single file and in the longitudinal orientation. As the containers pass off of the lane transition apparatus they are set upright onto a wide horizontal take-away belt where they are moved from the unscrambling apparatus for further processing.

A better understanding of the invention will be had by reference to the following description of the preferred embodiments, taken in conjunction with the attached drawings.

DESCRIPTION OF THE DRAWINGS

In FIG. 1 the large upright open top vessel is shown in cross-section with the other components of the apparatus in elevational view.

FIG. 2 is slightly increased in scale and is broken away to reduce the relative length of the vessel and unscrambler bed portions of the apparatus.

FIG. 3 is an enlarged cross-sectional view taken along the line 3—3 of FIG. 1 of the unscrambler bed showing the sets of belts which move on the unscrambler bed. FIGS. 2 and 3 show the apparatus arranged for eight sets of belts for simultaneously moving eight trains of containers, it being understood that the actual invention may be practiced with greater or fewer number of sets of belts which will effect only the overall width of the apparatus.

FIG. 4 is a cross-sectional view taken along the line 4—4 of FIG. 1 showing the slide plates onto which the containers pass after they pass from the unscrambler bed discharge end.

FIG. 7 is an enlarged elevational view of a pulley as employed as a part of the unscrambler bed showing the arrangement wherein the belts making up each set of belts are supported by the pulleys in V-shaped arrangement and with an uneven number of belts in each wing of the "V".

DESCRIPTION OF THE PREFERRED EMBODIMENTS

Figure 1:
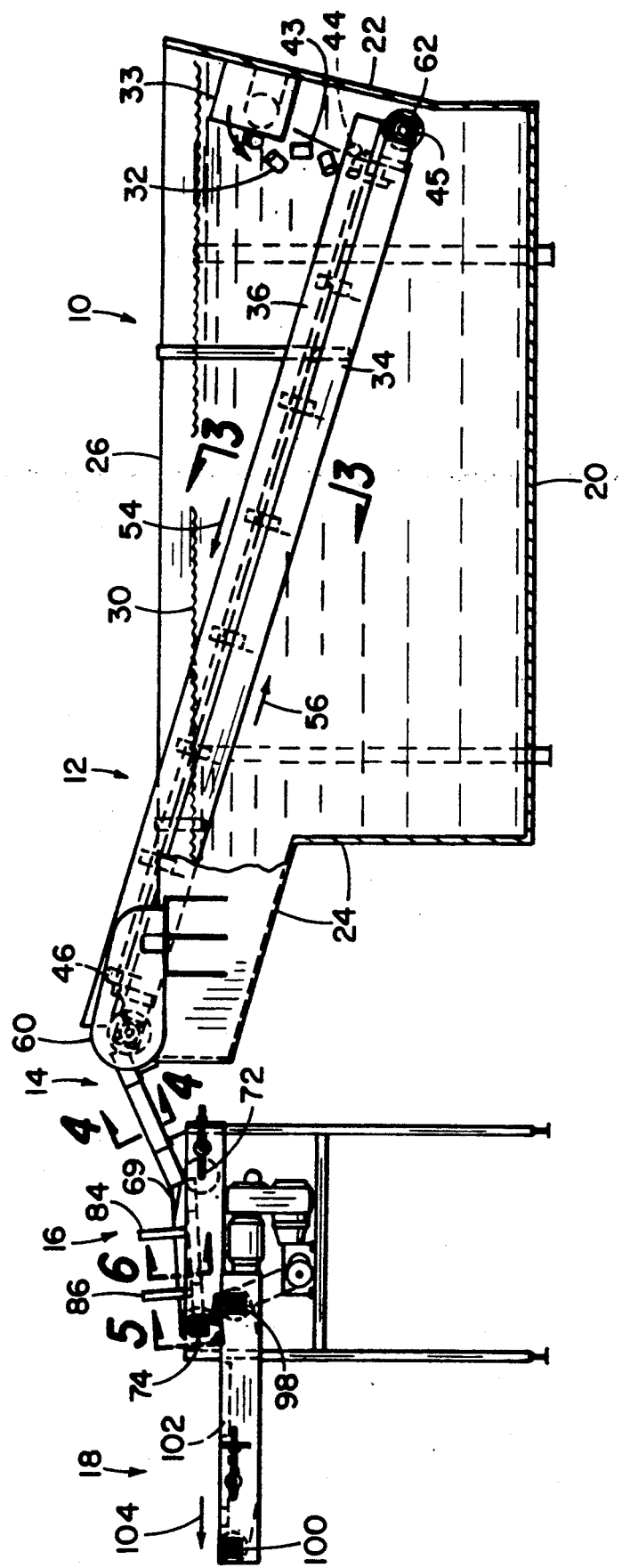
FIG. 1 is an elevational partially cross-sectional view of the apparatus for unscrambling containers of this disclosure.
Figure 2:
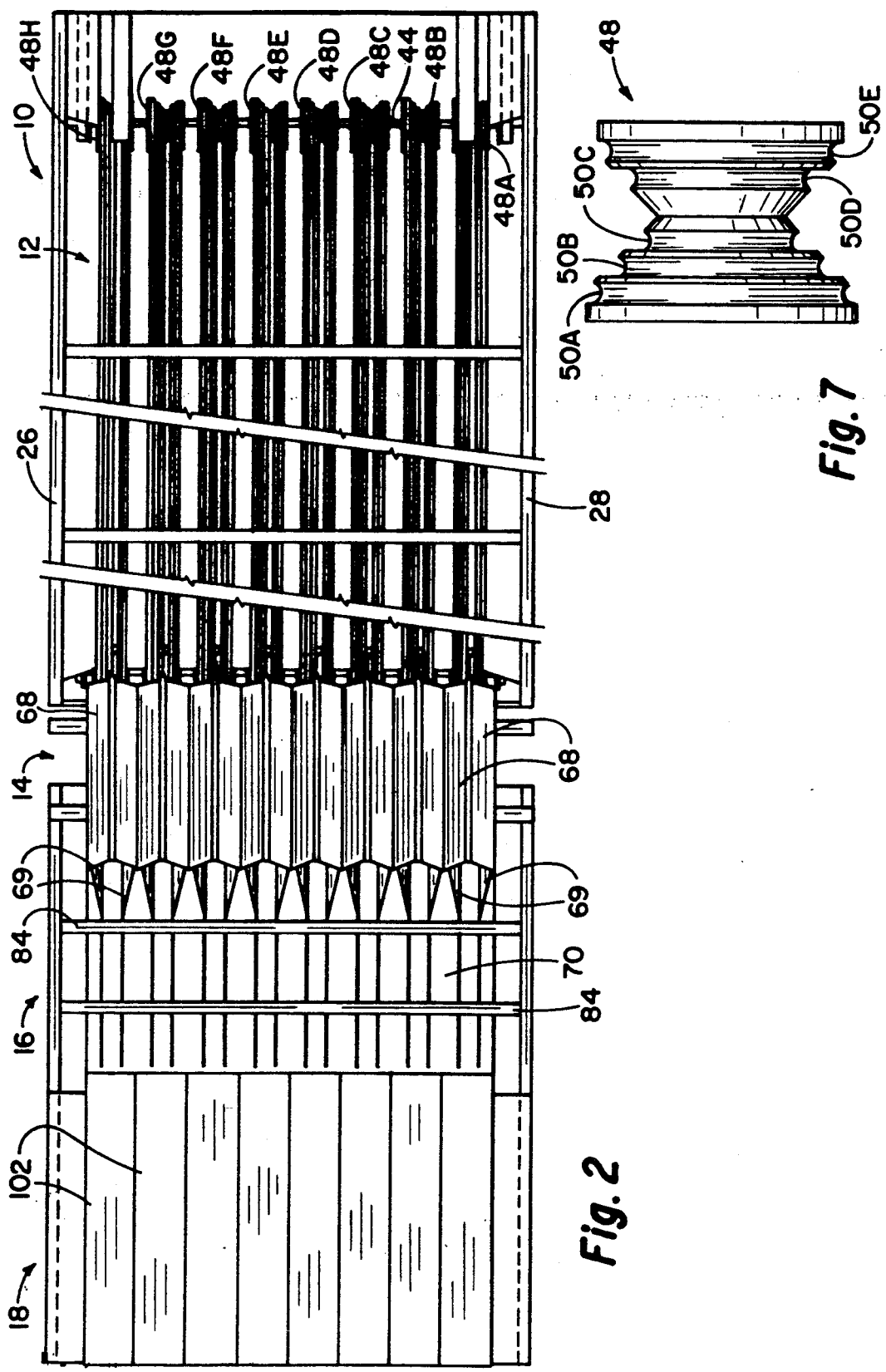
FIG. 2 is a top plan view of the unscrambling apparatus of FIG. 1.

Referring to the drawings and first to FIGS. 1 and 2, an apparatus for practicing the concept of this invention is illustrated, it being understood that the illustration is by way of example only and the principles of the invention may be practiced utilizing an apparatus having a different appearance than that illustrated herein but which, nevertheless, employs the principles of this invention. The unscrambling apparatus illustrated in FIGS. 1 and 2 is formed of five basic components as follows: an upright open top vessel 10; an elongated inclined unscrambler bed 12; slide plates 14; a lane transition section 16; and a take-away belt 18. Each of these basic components of the unscrambler apparatus will be now described in greater detail.

Vessel 10 has a bottom 20, an intake end wall 22, a discharge end wall 24 and opposed sidewalls 26 and 28. Vessel 10 is open at the top and is substantially filled with water, the water surface being indicated by the numeral 30. Containers to be unscrambled are discharged in a scrambled manner into vessel 10 adjacent the intake wall 22, such containers being illustrated by the numeral 32. While containers 32 can be delivered in a variety of ways, a preferred way is by a conveyor 33 which delivers the containers underwater into vessel 10. In the typical canning process the containers 32 have been filled with food, sealed and cooked in a pressure cooker and are heavier than water. The containers settle downwardly into the water at the vessel intake end 22.

The unscrambler bed 12, as seen in elevational cross-sectional view in FIG. 3, includes a bed plate 34 which, in cross-section as in FIG. 3, is horizontal, however, the entire bed plate 34 is inclined and extends the length of the unscrambler bed. At the opposite sides of the bed plate are side plates 36 and 38. Positioned on bed plate 34 are a plurality of inverted V-shaped plates 40A-40G. As previously stated, the illustrated unscrambler employs eight separate lanes for elevating containers out of the water in which they are deposited within the vessel, and the use of eight is merely illustrative as the invention can be utilized with other number of lanes. Seven inverted V-shaped plates with opposed inclined end plates 42A and 42B provide the eight lanes of this embodiment.

A baffle 43 directs containers 32 as they pass off conveyor 33 onto unscrambler bed 12. Distribution and movement of containers 32 on unscrambler bed 12 is facilitated by a flow of water, by means of nozzles 44 (only one of which is seen in FIG. 1), upon introduction of the containers to the unscrambler.

Supported at the intake end of unscrambler bed 12 is an axle 45 and at the discharge end an axle 46. Each axle supports eight spaced apart pulleys of the type illustrated in FIG. 7. As shown in FIG. 7, each pulley 48 has five belt grooves 50A-50E. The belt grooves are semicircular in cross-section, and pulley 48 is arranged so that the belt grooves form a "V" with one wing of the "V" having three belt grooves 50A-50C and the other wing of the "V" having two belt grooves 50D and 50E. FIG. 2 shows pulleys 48A-48H at the intake end on axle 45, and in similar arrangement axle 46 at the unscrambler bed discharge end has eight pulleys of the type illustrated in FIG. 7 and arranged in the same way as the pulleys at the intake end.

Extending between the pulleys on axles 45 and 46 are sets of belts, there being five continuous belts for each set of pulleys on axles 45 and 46. These are shown in FIG. 3. As an example, between inverted V-shaped plates 40A and 40B is a set of belts 52A-52D. The belts are shown in cross-section above bed plate 34 and below the bed plate since the belts are continuous and move in the inclined upwardly direction, as indicated by arrow 54 in FIG. 1, above the bed plate and in the downwardly inclined direction as indicated by arrow 56, below the bed plate. Thus, there are five belts for each set and since eight sets are shown in the illustrated embodiment, a total of forty belts are employed for the unscrambler bed 12.

As shown in FIG. 3, affixed to the inverted V-shaped plates 40A-40G and the inclined end plates 42A and 42B are guide blocks 58 so that the belts are maintained in their V-shaped cross-sectional orientation.

As shown in FIG. 3, containers 32 ride upwardly on the unscrambler bed. The containers may be orientated in end-to-end "bullet" orientation or in angular orientation. In FIG. 3, six containers are shown in the bullet orientation and two in the angular orientation. The purpose of the unscrambler bed is to arrange containers in sequential relationship that move according to the speed of movement of the belts in sequence up out of vessel 10 to be discharged off of the unscrambler bed discharge end 60. The unscrambler bed intake end is indicated by the numeral 62.

As containers 32 move downwardly through the water and onto the unscrambler bed at intake end 62, they tend to conglomerate onto the moving belts in disorganized fashion. The unscrambler bed has unique features that break up the disorganization as the containers move upwardly through and out of the water. Several important features help break up the disorientated arrangement of the containers and move them in sequential arrangement. These include the arrangement of the sets of belts in V-shaped arrangement, as illustrated in FIG. 3. In addition, the use of a V-shaped arrangement, wherein there are more belts on one wing of the "V" than on the other wing, helps cause the containers to tend to align in bullet orientation. This is achieved since there is more frictional force applied against the containers on one side of the "V" than the other by the use of more belts on one side.

An additional and important feature is the provision wherein the belts travel at different speeds. The belts move on pulleys of the type described with reference to FIG. 7. Referring to FIG. 7, it can be seen that the diameter of belt groove 50A is substantially greater than the diameter of belt grooves 50C or 50D. Since the belts are moved by the rotation of the sheaves, the belt in groove 50A will travel faster than the belt in groove 50C. On the other hand, the belt in groove 50B, having a larger diameter groove, will travel faster than the belt in groove 50C. Since the grooves are all of different diameters, all five belts travel at different speeds and, therefore, apply different frictional engagement with the containers riding on the belts. Since the outer belts in each set, that is, specifically belts 52A and 53E, travel at faster speeds than the inner belts, that is, those riding in grooves 50C and 50D, there is a tendency for the outer belts to cause the containers, when in standing position as are two of the containers shown in FIG. 3, to assume the bullet position as six of the containers shown in FIG. 3. When in the bullet position the containers are engaged only by two belts, whereas in the straddle position they are engaged by all five belts. Since the belts travel at different speeds there is a tendency of moving the containers from the straddle position to the bullet orientation, although some of the containers will inevitably pass off of the unscrambler bed discharge end 60 still in the straddle position.

After the containers pass off of the unscrambler bed discharge end 60 they pass onto a short downwardly inclined slide plate area 14, which is illustrated in cross-sectional arrangement in FIG. 4. This slide plate section has a base plate 64, which in any cross-section taken perpendicular to its length is horizontal. On base plate 64 are positioned support plates 66 configured to provide eight essentially V-shaped channels. Positioned in each of the eight channels of support plate 66 are slide plates 68 that are of essentially V-shaped cross-sectional arrangement. The slide plates 68 are formed of very low frictional material and preferably are formed of a plastic product identified by the trademark "TEFLON", the trademark of DuPont Company.

Containers 32 slide down slide plates 68 by gravity. The V-shaped configuration of the slide plates tends to move the containers into the bullet orientation as illustrated in FIG. 4. However, some of the containers nevertheless can be in the straddle position as they slide down slide plates 68.

Figure 5:
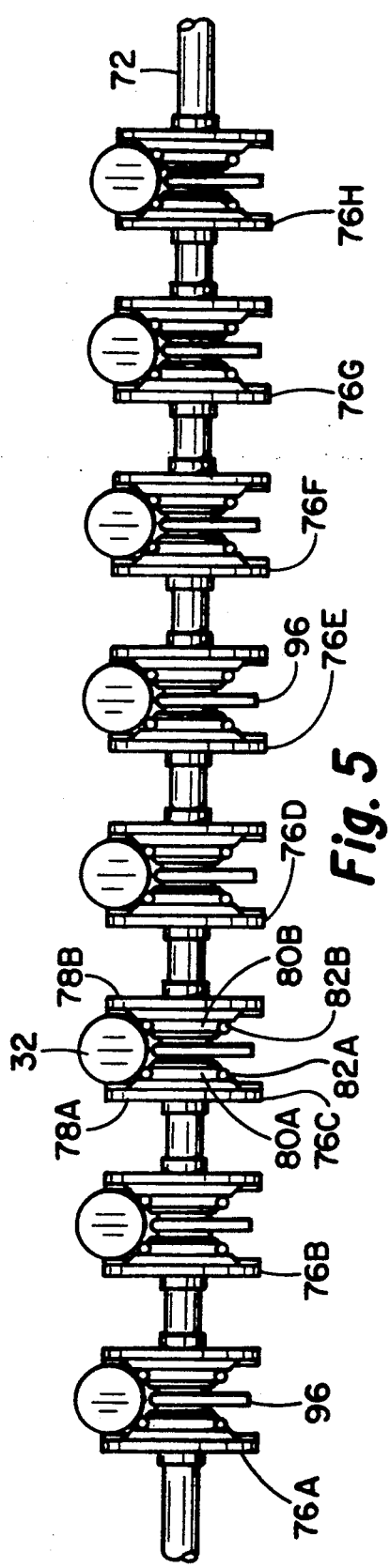
FIG. 5 is a cross-sectional view taken along the line 5—5 of FIG. 1 showing only the axle and pulleys at the end of the lane transition apparatus and showing the arrangement of the pulleys for moving individual containers off of the lane transition apparatus and onto a take-away belt in a manner so that the containers are set upright on the take-away belt.
Figure 6:
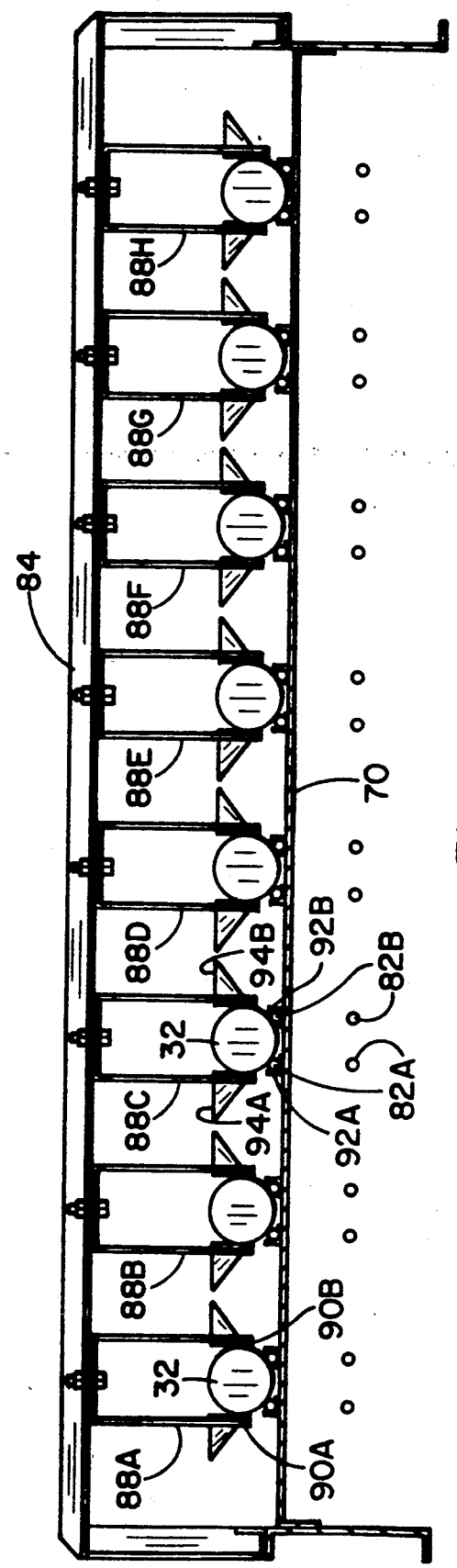
FIG. 6 is a cross-sectional view taken along the line 6—6 of FIG. 1 showing the lane transition portion of the apparatus in elevational view whereby the containers, after passing off of the slide plates, are arranged in end-to-end or "bullet" orientation.

As the containers move down and off of the slide plates, they pass onto the lane transition section 16, best illustrated in the cross-sectional view of FIG. 6. This lane transition section has a horizontal bed plate 70. Mounted at intake end of bed plate 70 is an axle 72 and at the discharge end of the bed plate axle 74. The axles are of the type as illustrated in FIG. 5 and each has a plurality of pulleys, depending upon the number of lanes in the apparatus. In the illustrated apparatus, each of the axles 72 and 74 has eight pulleys 76A-76H. Each of the pulleys, as shown in FIG. 5, are formed to have opposed radial side discs. As an example, pulley 76C has opposed side discs 78A and 78B which are of a diameter such that a container 32 can be received therebetween, that is, the spacing between side discs 78A and 78B is greater than the diameter of container 32.

Each pulley 76 has opposed belt grooves 80A and 80B of the same diameter, and these belt grooves receive belts 82A and 82B. The belts, like belts 52 on the unscrambler bed, are preferably of circular cross-section as illustrated. The belts travel in the forward direction above bed plate 70 and in the rearward direction below the bed plate, that is, in FIG. 6 belts 82A and 82B above bed plate 70 are moving toward the viewer and belts 82A and 82B below bed plate 70 are moving away from the viewer.

Referring back to FIG. 6, the lane transition section has a pair of transversely extending brackets 84 and 86. The bracket 84 is shown in FIG. 6. Brackets 84 and 86 extend across and are spaced above bed plate 70. Extending downwardly from bracket 84 are eight sets of container guides 88A-88H. The container guides are of adjustable width depending upon the specific size of the containers being unscrambled and have a width that permits containers to pass therethrough only when the containers are in the bullet orientation, that is, it will not permit containers to pass through that are in the straddle position. Opposed wings of each of the container guides has low friction guide plates. By example, container guide 88A has guide plates 90A and 90B which are low friction to permit the containers to pass therethrough with the spacing between container guides 90A and 90B being only slightly greater than the diameter of the containers.

L-shaped brackets 92A and 92B are positioned below each of the container guides. As shown in FIG. 6, by example, the L-shaped brackets 92A and 92B are positioned below container guide 88C. The L-shaped brackets 92A and 92B serve to guide belts 82A and 82B and maintain them in proper spacing to support containers riding thereon. To guide the containers between the opposed portions of each of the container guides, each includes wings 94A and 94B, as indicated with respect to container guide 88C, so that as the containers pass off of the slide plate section 14 they are guided between the container guides.

FIG. 5 shows a vertical rod element 96 positioned in front of each of the pulleys 76A–76H. The rod elements 96 are not part of the pulleys but extend upwardly from bed plate 70, which is not shown in FIG. 5. The function of rod elements 96 is to guide the containers as the containers turn off the end of the pulleys so that the containers are set upright on the take-away belt 18.

While not shown in a cross-sectional view, the take-away belt section 18 has opposed axles 98 and 100 with a flat belt 102 therebetween, which is shown in dotted outline in FIG. 1. When containers pass off of the end of lane transition 16, the containers are set upright onto the flat belt and are moved in the direction indicated by arrow 104 so that the containers are carried away from the unscrambler for further processing, such as for labeling, packaging and so forth.

Positioned at the lower end of each of the "TEFLON" slide plates 68 is a V-shaped slot 69 (see FIGS. 1 and 2). If a container 32 travels down the slide plate 68 in a standing or sideways position, such as two of the containers shown in FIG. 3, the end of the container engages one of the V-shaped slots 69, causing the container to turn into the longitudinal orientation so that the containers will align in the longitudinal orientation as shown in FIGS. 5 and 6.

Thus, the containers are moved from a scrambled condition as they are dumped into the water within vessel 10 into upright orientation in an organized manner off of the end of belt 102. The containers are handled in a manner to reduce the chance of denting and with minimal labor and supervision.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for unscrambling substantially identical sealed containers each having a preferred orientation comprising:
    an upright open top vessel having opposed ends and containing water therein;
    an elongated inclined unscrambler bed having an intake end and a discharged end and having an upper surface and a lower surface;
    a plurality of sets of belts arranged in paralleled spaced apart vertical planes and supported by said unscrambler bed, each set of belts passing upwardly over said bed upper surface and downwardly below said bed lower surface, each set of belts being formed of a plurality of belts in spaced apart vertical planes and in essentially V-shaped arrangement taken in planes perpendicular the direction of travel having opposed wing portions, there being more belts in one wing portion than the other, the bed being received within said vessel with said bed intake end below said water and said discharge end above said water;
    means to receive containers within said vessel in scrambled fashion, the containers settling through said water and onto said belts of said bed;
    means of moving said sets of belts whereby containers are carried by said belts up and out of said water substantially all in the preferred orientation to pass off said belts at said bed discharge end; and
    means for arraying containers passing off said bed discharge end for further processing.

2. An apparatus for unscrambling containers according to claim 1 wherein at least some of said belts forming said plurality of belts making up each set of belts travel at a speed different from other belts in each said set of belts.

3. An apparatus for unscrambling containers according to claim 1 wherein said set of belts arranged in opposed wings of an essentially V-shaped cross-section configuration have, in each set, one wing having three belts and one wing having two belts.

4. An apparatus for unscrambling containers according to claim 1 wherein each said belt in at least some of said sets of belts is of generally circular cross-sectional configuration.

5. An apparatus for unscrambling containers according to claim 1 wherein said unscrambler bed has at said intake end and at said discharge end a transverse axle, each axle having a multi-sheave sprocket thereon for each of said sets of belts, there being one sheave for each belt in each said set.

6. An apparatus for unscrambling containers according to claim 5 wherein said sheaves on each of said sprockets are of differing diameters.

7. An apparatus for unscrambling containers according to claim 1 including:
    a downwardly inclined planar slide plate means having an upper and a lower end, the upper end being positioned adjacent said unscrambler bed discharged end, whereby containers passing off said unscrambler bed slide down for further processing.

8. An apparatus for unscrambling containers according to claim 7 including:
    lane transition means having a container receiving end and a container discharge end, the container receiving end being positioned under said slide plate means lower end, the lane transition means serving to move said containers away from said unscrambler bed discharge end.

9. An apparatus for unscrambling containers according to claim 8 wherein said lane transition means is formed by a plurality of paralleled flat belts forming an upper planar surface on which containers move away from said unscrambler bed.

10. An apparatus according to claim 9 including alignment means interposed between said side plate means and said lane transition means providing means to cause said containers to move in uniform orientation.

11. An apparatus for unscrambling sealed containers each having a preferred orientation comprising:
    an upright open top vessel having opposed ends and containing water therein;
    a plurality of sets of belts arranged in paralleled spaced apart vertical planes and means to support said sets of belts within said vessel, each set of belts being inclined upwardly and having an intake end and a discharge end;
    each set of belts being formed of a plurality of belts in spaced apart vertical planes and in essentially V-shaped arrangement taken in planes perpendicular the direction of travel, each set of belts being received within said vessel with said intake end below said water and said discharge end above said water wherein said essentially V-shaped arrangement of said belts in at least one set has opposed wing portions, there being more belts in one wing portion than the other;
    means to receive containers within said vessel in scrambled fashion, the container settling through said water and onto said sets of belts, each container having a preferred orientation;
    means of moving said sets of belts whereby containers are carried by said sets of belts up and through said water, the resistance of said water serving to cause substantially all said containers to align in the preferred orientation, said containers passing upwardly and out of said water and off said belts at said bed discharge end; and
    means for arraying containers passing off said sets of belts for further processing.

12. An apparatus for unscrambling containers according to claim 11 wherein at least some of said belts forming said plurality of belts making up each set of belts travel at a speed different from other belts in each said set of belts.

13. An apparatus for unscrambling containers according to claim 11 wherein said at least one set of belts are arranged in opposed wings of an essentially V-shaped cross-section configuration, one wing having three belts and one wing having two belts.

14. An apparatus for unscrambling containers according to claim 11 wherein each said belt in at least some of said sets of belts is of generally circular cross-sectional configuration.

15. An apparatus for unscrambling containers according to claim 11 including transverse axles, each axle having a multi-sheave sprocket thereon for each of said sets of belts, there being one sheave for each belt in each said set.

16. An apparatus for unscrambling containers according to claim 15 wherein said sheaves on each of said sprockets are of differing diameters.

17. An apparatus for unscrambling containers according to claim 11 including:
    a downwardly inclined planar slide plate means having an upper and a lower end, the upper end being positioned adjacent said discharged end of said sets of belts, whereby containers passing off said sets of belts slide down for further processing.

18. An apparatus for unscrambling containers according to claim 17 including:
    lane transition means having a container receiving end and a container discharge end, the container receiving end being positioned under said slide plate means lower end, the lane transition means serving to move said containers away from said sets of belts discharge end.

19. An apparatus for unscrambling containers according to claim 18 wherein said lane transition means is formed by a plurality of paralleled flat belts forming an upper planar surface on which containers move away from said sets of belts.

20. An apparatus according to claim 19 including alignment means interposed between said side plate means and said lane transition means providing means to cause said containers to move in uniform orientation.

* * * * *